US008067756B2

(12) United States Patent
Ueno et al.

(10) Patent No.: US 8,067,756 B2
(45) Date of Patent: Nov. 29, 2011

(54) EXTREME ULTRAVIOLET LIGHT SOURCE APPARATUS

(75) Inventors: Yoshifumi Ueno, Hiratsuka (JP); Georg Soumagne, Hiratsuka (JP); Shinji Nagai, Hiratsuka (JP); Akira Endo, Jena (DE); Tatsuya Yanagida, Hiratsuka (JP)

(73) Assignee: Gigaphoton, Inc., Tochigi (JP)

( * ) Notice: Subject to any disclaimer, the term of this patent is extended or adjusted under 35 U.S.C. 154(b) by 62 days.

(21) Appl. No.: 12/646,075

(22) Filed: Dec. 23, 2009

(65) Prior Publication Data

US 2010/0213395 A1 Aug. 26, 2010

(30) Foreign Application Priority Data

Dec. 26, 2008 (JP) ................................ 2008-333987
Dec. 21, 2009 (JP) ................................ 2009-289775

(51) Int. Cl.
*H05G 2/00* (2006.01)
*G01J 3/10* (2006.01)

(52) U.S. Cl. .................. 250/504 R; 250/364; 250/474.1

(58) Field of Classification Search .............. 250/504 R, 250/365, 370.09, 372, 461.1, 472.1, 473.1, 250/474.1
See application file for complete search history.

(56) References Cited

FOREIGN PATENT DOCUMENTS

JP 2005-197456 7/2005

*Primary Examiner* — Bernard E Souw
(74) *Attorney, Agent, or Firm* — McDermott Will & Emery LLP

(57) ABSTRACT

In an extreme ultraviolet light source apparatus generating an extreme ultraviolet light from a plasma generated by irradiating a target, which is a droplet D of molten Sn, with a laser light, and controlling the flow direction of ion generated at the generation of the extreme ultraviolet light by a magnetic field or an electric field, an ion collection cylinder 20 is arranged for collecting the ion, and ion collision surfaces Sa and Sb of the ion collection cylinder 20 are provided with or coated with Si, which is a metal whose sputtering rate with respect to the ion is less than one atom/ion.

12 Claims, 15 Drawing Sheets

EXTREME ULTRAVIOLET LIGHT SOURCE APPARATUS

CROSS-REFERENCE TO RELATED APPLICATIONS

This application is based upon and claims the benefit of priority from the prior Japanese Patent Applications No. 2008-333987, filed on Dec. 26, 2008, and No. 2009-289775, filed on Dec. 21, 2009; the entire contents of which are incorporated herein by reference.

BACKGROUND OF THE INVENTION

1. Field of the Invention

The present invention relates to an extreme ultraviolet light source apparatus generating an extreme ultraviolet light from plasma generated by irradiating a target with a laser light.

2. Description of the Related Art

In recent years, along with a progress in miniaturization of semiconductor device, miniaturization of transcription pattern used in photolithography in a semiconductor process has developed rapidly. In the next generation, microfabrication to the extent of 65 nm to 32 nm, or even to the extent of 30 nm and beyond will be required. Therefore, in order to comply with the demand of microfabrication to the extent of 30 nm and beyond, development of such exposure apparatus combining an extreme ultraviolet (EUV) light source for a wavelength of about 13 nm and a reduced projection reflective optics is expected.

As the EUV light source, there are three possible types, which are a laser produced plasma (LPP) light source using plasma generated by irradiating a target with a laser beam, a discharge produced plasma (DPP) light source using plasma generated by electrical discharge, and a synchrotron radiation (SR) light source using orbital radiant light. Among these light sources, the LPP light source has such advantages that luminance can be made extremely high as close to the black-body radiation because plasma density can be made higher compared with the DPP light source and the SR light source. Moreover, the LPP light source also has an advantage that strong luminescence with a desired wavelength band is possible by selecting a target material. Furthermore, the LPP light source has such advantages that there is no construction such as electrode around a light source because the light source is a point light source with nearly isotropic angular distributions, and therefore extremely wide collecting solid angle can be acquired, and so on. Accordingly, the LPP light source having such advantages is expected as a light source for EUV lithography which requires more than several dozen to several hundred watt power.

In the EUV light source apparatus with the LPP system, firstly, a target material supplied inside a vacuum chamber is excited by irradiation with a laser light and thus be turned into plasma. Then, a light with various wavelength components including an EUV light is emitted from the generated plasma. Then, the EUV light source apparatus focuses the EUV light on a predetermined point by reflecting the EUV light using an EUV collector mirror which selectively reflects an EUV light with a desired wavelength, e.g. a 13.5 nm wavelength component. The reflected EUV light is inputted to an exposure apparatus. On a reflective surface of the EUV collector mirror, a multilayer coating (Mo/Si multilayer coating) with a structure in that thin coating of molybdenum (Mo) and thin coating of silicon (Si) are alternately stacked, for instance, is formed. The multilayer coating exhibits a high reflectance ratio (of about 60% to 70%) with respect to the EUV light with a 13.5 nm wavelength.

The irradiation of the target with a laser light generates plasma, as described above. At the time of plasma generation, particles (debris) such as gaseous ion particles, neutral particles, and fine particles (such as metal cluster) which have failed to become plasma spring out from a plasma luminescence site to the surroundings. The debris are diffused and fly onto the surfaces of various optical elements such as an EUV collector mirror arranged in the vacuum chamber, focusing mirrors for focusing a laser light on a target, and other optical system for measuring an EUV light intensity, and so forth. When hitting the surfaces, fast ion debris with comparatively high energy erode the surface of optical elements and damage the reflective coating of the surfaces. As a result, the surfaces of the optical elements become a metal component, which is a target material. On the other hand, slow ion debris with comparatively low energy and neutral particle debris are deposited on the surfaces of optical elements. As a result, a compound layer made from the metallic target material and the material of the surface of the optical element is formed on the surface of the optical element. Damages to the reflective coating or formation of a compound layer on the surface of the optical element caused by such bombardment of debris decreases the reflectance ratio of the optical element and makes it unusable.

Japanese Patent Application Laid-open No. 2005-197456 discloses a technique for controlling ion debris flying from plasma using a magnetic field generated by a magnetic-field generator such as a superconductive magnetic body. According to the disclosed technique, a luminescence site of an EUV light is arranged within the magnetic field. Positively-charged ion debris flying from the plasma generated at the luminescence site are drifted and converge in the direction of magnetic field as if to wind around the magnetic line by Lorentz force of the magnetic field. This behavior prevents the deposition of debris on the surrounding optical elements, and thereby, the damages to the optical elements can be prevented. Additionally, the ion debris drifts while converging in the direction of the magnetic field. Therefore, it is possible to collect the ion debris efficiently by arranging an ion collection apparatus which collects ion debris in a direction parallel to the direction of magnetic field.

BRIEF SUMMARY OF THE INVENTION

In accordance with one aspect of the present invention, an extreme ultraviolet light source apparatus generating an extreme ultraviolet light from plasma generated by irradiating a target with a laser light, and controlling a flow direction of ion generated at the generation of the extreme ultraviolet light by a magnetic field or an electric field, comprises an ion collector which collects the ion and includes an ion collision surface provided with or coated with a metal whose sputtering rate with respect to the ion is less than 1 atom/ion.

These and other objects, features, aspects, and advantages of the present invention will become apparent to those skilled in the art from the following detailed description, which, taken in conjunction with the annexed drawings, discloses preferred embodiments of the present invention.

DETAILED DESCRIPTION OF THE INVENTION

Exemplary embodiments of an extreme ultraviolet light source apparatus according to the present invention will be described below in detail with reference to the accompanying drawings.

First Embodiment

Figure 1:
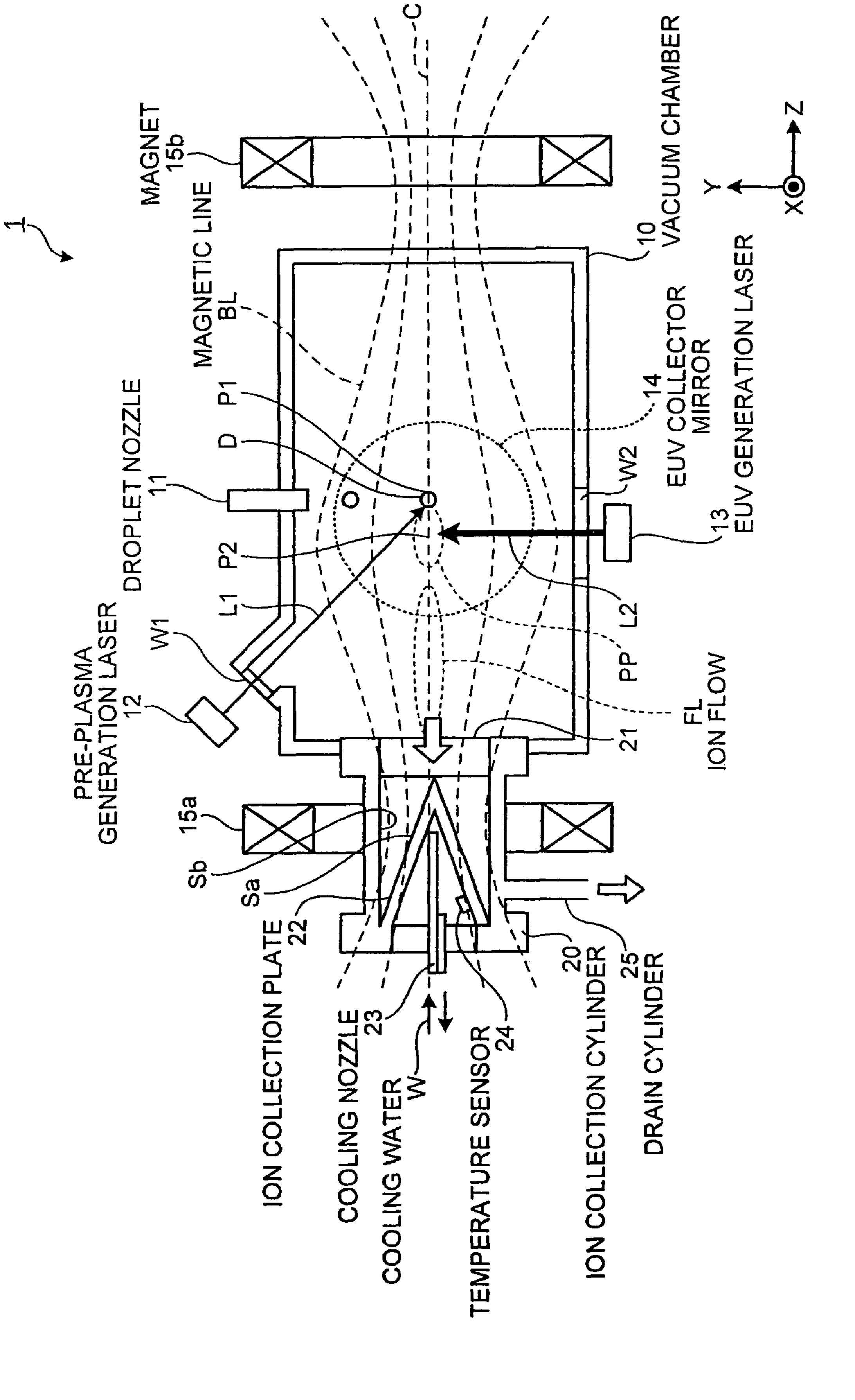
FIG. 1 is a sectional view of an extreme ultraviolet light source apparatus according to a first embodiment of the present invention.

FIG. 1 is a sectional view of an extreme ultraviolet light source apparatus according to a first embodiment of the present invention. In FIG. 1, an extreme ultraviolet light source apparatus 1 includes a vacuum chamber 10. A droplet nozzle 11 ejects a droplet D of molten Sn into the vacuum chamber 10. A pre-plasma generation laser 12, which is a YAG pulse laser, is arranged outside the vacuum chamber 10. A pre-plasma generation laser light L1 outputted from the pre-plasma generation laser 12 enters the vacuum chamber 10 via a window W1, and hits a part of the droplet D ejected from the droplet nozzle 11 at position P1 which is substantially at the center of the vacuum chamber 10. As a result, pre-plasma PP is generated in −Z direction. Herein, "pre-plasma" refers to a state of plasma, or a state of mixture of plasma and steam.

Furthermore, an EUV generation laser 13, which is a $CO_2$ pulse laser, is arranged outside the vacuum chamber 10. An EUV generation laser light L2 outputted from the EUV generation laser 13 enters the vacuum chamber 10 via a window W2, and hits the pre-plasma at position P2 substantially at the center of pre-plasma at the timing of generation of the pre-plasma PP. Thus, the pre-plasma PP emits an EUV light, and generates ion debris. The emitted EUV light is focused and outputted to the outside of the vacuum chamber 10 by an EUV collector mirror 14, which focuses the EUV light and radiates the focused EUV light outside the vacuum chamber 10.

Meanwhile, a pair of magnets 15*a* and 15*b*, which generate a magnetic field in Z direction, is arranged outside the vacuum chamber 10 as though sandwiching the positions P1 and P2 in order to control the moving direction of ion debris such as Sn ion flying from the pre-plasma PP. The pair of magnets 15*a* and 15*b* is made of superconductive magnet or a magnet coil. The generated ion debris converge along magnetic line BL due to Lorentz force of the magnetic field generated by the pair of magnets 15*a* and 15*b*, and thus form an ion flow FL which moves along central axis C of the magnetic field.

In the first embodiment, the pre-plasma PP is generated in the −Z direction, and therefore, the converging ion flow FL moves in the −Z direction. Therefore, an ion collection cylinder 20, which is an ion collecting device, is arranged on a side surface of the vacuum chamber 10 in the −Z direction.

A shape of the ion collection cylinder 20 is a cylindrical shape whose central axis coincides with the central axis C of the magnetic field. The ion collection cylinder 20 has an aperture 21 on a surface, which is vertical to the central axis C and facing the inside of the vacuum chamber 10. The aperture 21 has a diameter equal to or larger than 1.5 times the convergence diameter of the ion flow FL, and preferably equal to or larger than 100 mm. In the ion collection cylinder 20, an ion collection plate 22 is arranged. The ion collection plate 22 has a conic shape whose axis coincides with the central axis C and whose apex is at the side of the vacuum chamber 10. On a surface Sa of the ion collection plate 22 at the side of the vacuum chamber 10 and on an inner wall surface Sb of the ion collection cylinder 10, coating made of C or Si, which is less likely to be sputtered by Sn ion, or a multilayer coating made by spraying C or Si on Cu, which has favorable thermal conductivity, is formed to prevent the sputtering by the collision of fast Sn ion, which is ion debris. The surface Sa of the ion collection plate 22 is inclined with respect to the central axis C. Thereby, the collision surface of Sn ion is made wider, and the impact of collision per unit area can be reduced. Inclination angle θ (see FIG. 2) of the surface Sa with respect to a surface vertical to the central axis C may be, for example, about 30 degrees.

Cooling water W flows through a cooling nozzle 23 into a region demarcated by the backside of the surface Sa of the ion collection plate 22 and a bottom portion of the ion collection cylinder 20 so that the ion collection plate 22 is not overheated. On the backside of the ion collection plate 22, a temperature sensor 24 is arranged. The flow rate of the cooling water W is adjusted based on the temperature detected by the temperature sensor 24. The temperature of the ion collection plate 22 is thus controlled to be equal to or higher than a temperature at which the target metal melts (e.g., equal to or higher than 231° C. in the case of Sn) and the ion collection plate 22 is not overheated. Molten Sn adhered to the surface Sa of the ion collection plate 22 or the inner wall surface Sb of the ion collection cylinder 20 is discharged through a drain cylinder 25. Thus, the surface Sa of the ion collection plate 22 is prevented from being covered by Sn, and the surface can remain highly resistive to sputtering. In addition, a heater may preferably be arranged to control the temperature of the inner wall surface Sb of the ion collection cylinder 20 in order to heat the inner wall surface Sb to a temperature being equal to or higher than the melting temperature, because the inner wall surface Sb, with which the ion debris do not directly collide, would not be heated otherwise. The molten Sn flows in the direction of gravitational force due to its own weight. Therefore, the direction of discharge of the ion collection cylinder 20 and the drain cylinder 25 is preferably set inclined in the direction of gravitational force.

Figure 2:
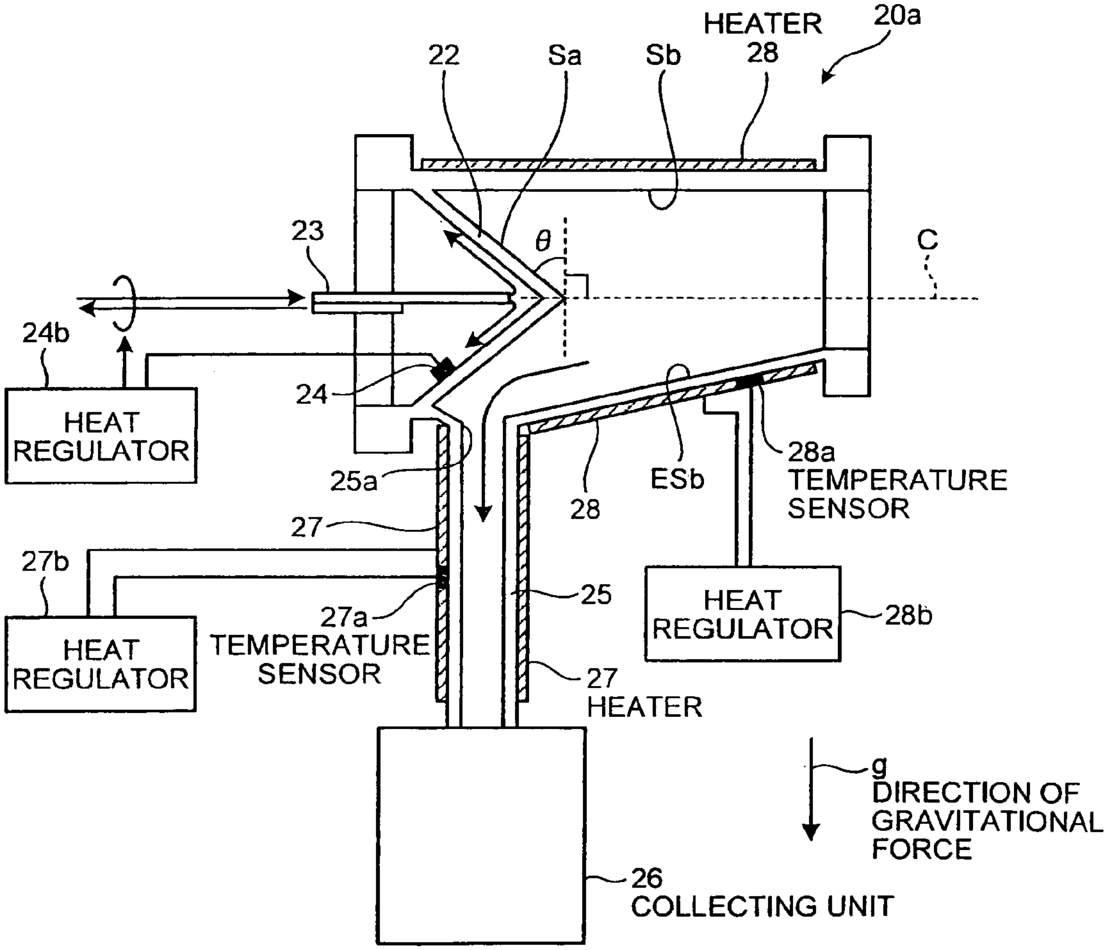
FIG. 2 is a sectional view illustrating a configuration of a variation of an ion collection cylinder illustrated in FIG. 1.

For example, among the inner wall surface Sb of an ion collection cylinder 20*a* illustrated in FIG. 2, an inner wall surface ESb which is at the side of the gravitational force is inclined toward an aperture 25*a* at the input side of the drain cylinder 25 with respect to the direction of gravitational force g. Needless to say, the discharge direction of the internal flow path of the drain cylinder 25 has a component in the direction of gravitational force. At the other end of the drain cylinder 25 in the direction of gravitational force, a collecting unit 26 is arranged for collecting the molten Sn. The outer wall surface corresponding to the inner wall surface Sb is covered by a heater 28. Similarly, the outer wall surface of the drain cylinder 25 is covered with a heater 27. Temperature sensors 28*a* and 27*a* are attached to these outer wall surfaces, respectively. Heat regulators 28*b* and 27*b* apply voltages to the heaters 28 and 27, based on the temperature detected by the respective temperature sensors 28*a* and 27*a*, respectively. With this, the temperature of each inner wall surface is controlled to be a temperature at which Sn melts. Meanwhile, the cooling water W flows to the backside of the ion collection plate 22 via the cooling nozzle 23, as described above. Thus, the temperature of the surface Sa of the ion collection plate 22 is controlled to be a temperature at which Sn melts. In this temperature control, a heat regulator 24*b* adjusts the flow rate of the cooling water W based on the temperature detected by the temperature sensor 24 to control the temperature. This configuration allows the temperature inside the ion collection cylinder 20*a* to remain substantially uniformly at the melting temperature of Sn. In addition, Sn trapped by the ion collection cylinder 20*a* flows in the direction of gravitational force in a molten state and eventually collected by the collecting unit 26. Herein, the heater 27/28 and the cooling water W are employed for temperature control. Alternatively, however, the temperature may be controlled by various types of heat regulator such as a sheet heater and Peltier element.

In this explanation, the surface Sa of the ion collection plate 22 and the inner wall surface Sb illustrated in FIG. 1 are formed from Si. Si is merely an example of substance whose sputtering rate (atom/ion) with respect to incoming Sn ion is less than one. Herein, "sputtering rate" refers to a ratio represented by the number of atoms sputtered by one incoming Sn particle. For example, when the sputtering rate is ten, it means that ten atoms are sputtered by one incoming Sn ion. In other words, when the sputtering rate is less than one, less than one atom is sputtered by one incoming Sn ion. That means the number of sputtered particles is very small.

Figure 3:
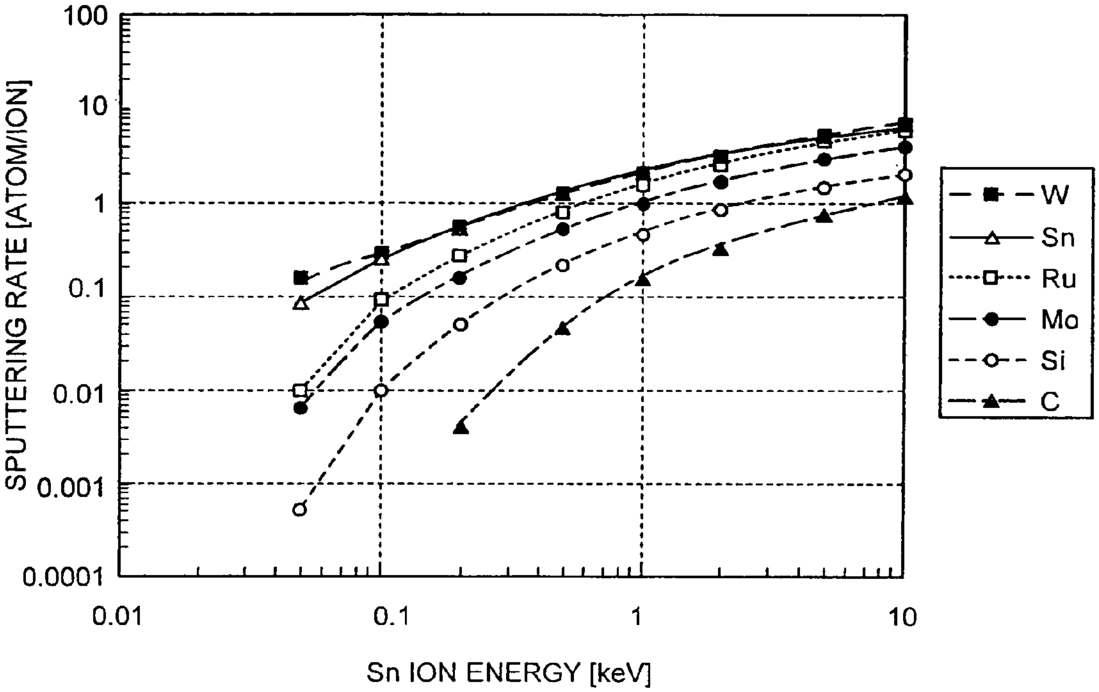
FIG. 3 is a diagram illustrating dependency of sputtering rate on energy of Sn ion using materials of an ion collision surface as a parameter.

FIG. 3 illustrates the dependency of sputtering rate on the energy of incoming Sn ion, using various materials as parameters. The energy of Sn ion coming into the ion collection cylinder 20 is, for example, about 0.5 keV. Referring to FIG. 3, when the energy of Sn ion is in the neighborhood of 0.5 keV, sputtering rate is less than one for any of W (tungsten), Sn (tin), Ru (ruthenium), Mo (molybdenum), Si (silicon), and C (carbon). Hence, it can be seen that the sputtering effect can be reduced when the surface Sa of the ion collection plate 22 and the inner wall surface Sb are made of these materials. In addition, sputtering rate can be less than one for Mo when the energy of Sn ion is equal to or lower than about 1 keV, for Si when the energy of Sn ion is equal to or lower than about 3 keV, and for C when the energy of Sn ion is equal to or lower than about 9 keV.

Furthermore, it is apparent from FIG. 3 that the sputtering rate decreases as the energy of Sn ion lowers. Hence, a wider variety of materials can be employed when the energy of incoming Sn ion is lowered or when the energy of Sn ion at its generation is made lower. In particular, it is preferable to make the energy of incoming Sn ion lower than 0.5, because this can make the sputtering rate of Sn to be equally less than one. With this, the sputtering of Sn adhered to the internal surface of the ion collection cylinder 20 can be reduced.

In the first embodiment, firstly the pre-plasma PP is generated, and the pre-plasma PP is used as a target for the generation of EUV light. It is known from the experiments that when the pre-plasma PP is used as a target, maximum energy of generated Sn ion is 0.6 keV. Hence, when the surface Sa, for example, is coated with Si, the sputtering of the coating material (Si) can be reduced.

Figure 4:
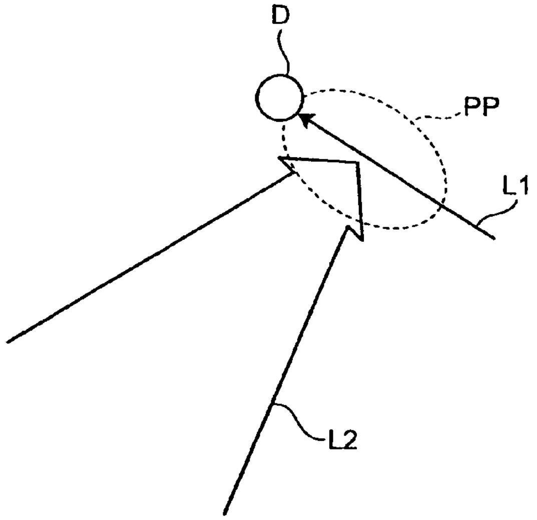
FIG. 4 is a diagram illustrating an example of two-step irradiation of a liquid target according to the first embodiment of the present invention.
Figure 5:
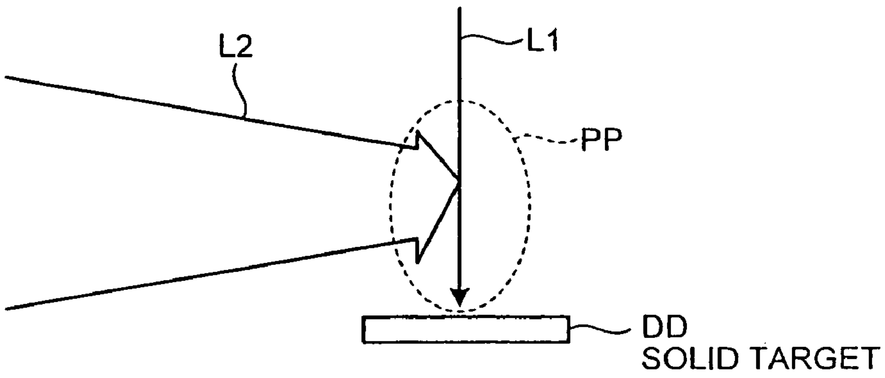
FIG. 5 is a diagram illustrating an example of two-step irradiation of a solid target according to the first embodiment of the present invention.

The pre-plasma PP target is generated by irradiating the droplet D with the pre-plasma generation laser light L1 which is, for example, a low-intensity YAG laser light, as illustrated in FIG. 4. The irradiation of the pre-plasma generation laser light L1 causes the pre-plasma PP to be generated as if being blown out from the droplet D. Thus, in the generation of EUV light, two-step irradiation is performed, the two-step irradiation including the steps of: generating pre-plasma PP; and irradiating the pre-plasma PP with the EUV generation laser light L2 such as the $CO_2$ laser light. Because the intensity of the pre-plasma generation laser light L1, which is, for example, a YAG laser light, is low, the energy of Sn ion in the generated pre-plasma PP is one-digit smaller compared with that generated by $CO_2$ laser light. Here, because the pre-plasma PP is used as a target instead of a solid or the droplet D itself in the generation of EUV light, it is sufficient as far as the EUV generation laser light L2 such as the $CO_2$ laser light has a sufficient intensity to cause excitation for EUV light generation. Thus, the intensity of the EUV generation laser light L2 can be lowered. As a result, the initial energy of generated Sn ion can be lowered. The initial energy of generated Sn ion can also be lowered by performing two-step irradiation illustrated in FIG. 5 even when a solid target such as a plate, wire, or ribbon is used instead of the droplet D of liquid Sn by employing the two-step irradiation which includes the steps of: generating the pre-plasma PP by irradiating the surface of a solid target DD with the pre-plasma generation laser light L1 as if to blow out the PP; and irradiating the generated pre-plasma PP with the EUV generation laser light L2.

Figure 6:
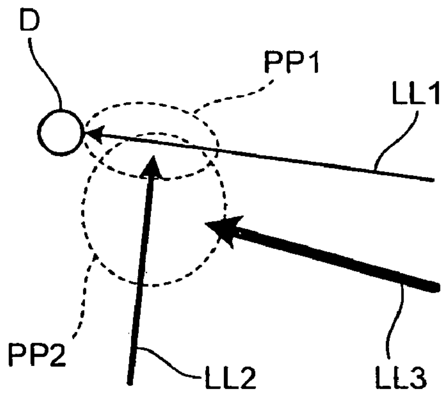
FIG. 6 is a diagram illustrating an example of multi-step irradiation of a liquid target according to the first embodiment of the present invention.
Figure 7:
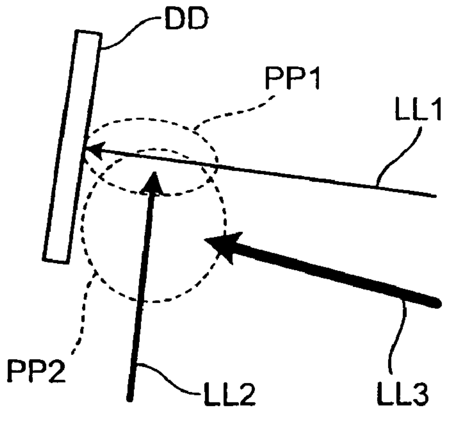
FIG. 7 is a diagram illustrating an example of multi-step irradiation of a solid target according to the first embodiment of the present invention.

Furthermore, the initial energy of the generated Sn ion can be further lowered by using multi-step irradiation including more than two steps of irradiation for the generation of EUV light. FIG. 6 is a schematic view illustrating the EUV light generation by three-step irradiation of the droplet D of liquid Sn. As illustrated in FIG. 6, firstly the droplet D is irradiated with a first pre-plasma generation laser light LL1 to generate a first pre-plasma PP1. Then, the first pre-plasma PP1 is irradiated with a second pre-plasma generation laser light LL2 to generate a second pre-plasma PP2. Finally, the second pre-plasma PP2 is irradiated with an EUV generation laser light LL3 to generate an EUV light. At this stage, Sn ion with a low initial energy is generated. With this three-step irradiation, the initial energy of generated Sn ion can further be lowered, and thus the sputtering of an irradiation surface such as the surface Sa of the ion collection plate 22 can more securely be prevented. Multi-step irradiation such as the three-step irradiation can be used for the solid target DD illustrated in FIG. 7 in a similar manner. The solid target DD may preferably be formed in the shape of a rotating plate, moving wire, or moving ribbon, so that a new Sn surface is continuously supplied to a position irradiated with the pre-plasma generation laser light.

As described above, in the first embodiment, the collision surface of the ion collection cylinder 20 with which the Sn ion collides (i.e., surface of a coating covering the surface Sa or the surface Sa itself of the ion collection plate 22) is a metallic surface whose sputtering rate is less than one. Thereby, the sputtering of a material forming the collision surface can be prevented. As a result, the ion contamination inside the vacuum chamber 10 can be prevented. Furthermore, the use of multi-step irradiation in the generation of pre-plasma PP in the process of EUV light generation allows the initial energy of Sn ion to be lowered. Thereby, the sputtering of the collision surface can be prevented even more securely, and the ion contamination in the vacuum chamber 10 can be prevented even more securely. Even when Sn is deposited on the collision surface, the possibility of re-sputtering of the deposited Sn can be lowered as the initial energy of Sn ion is lowered.

Figure 8:
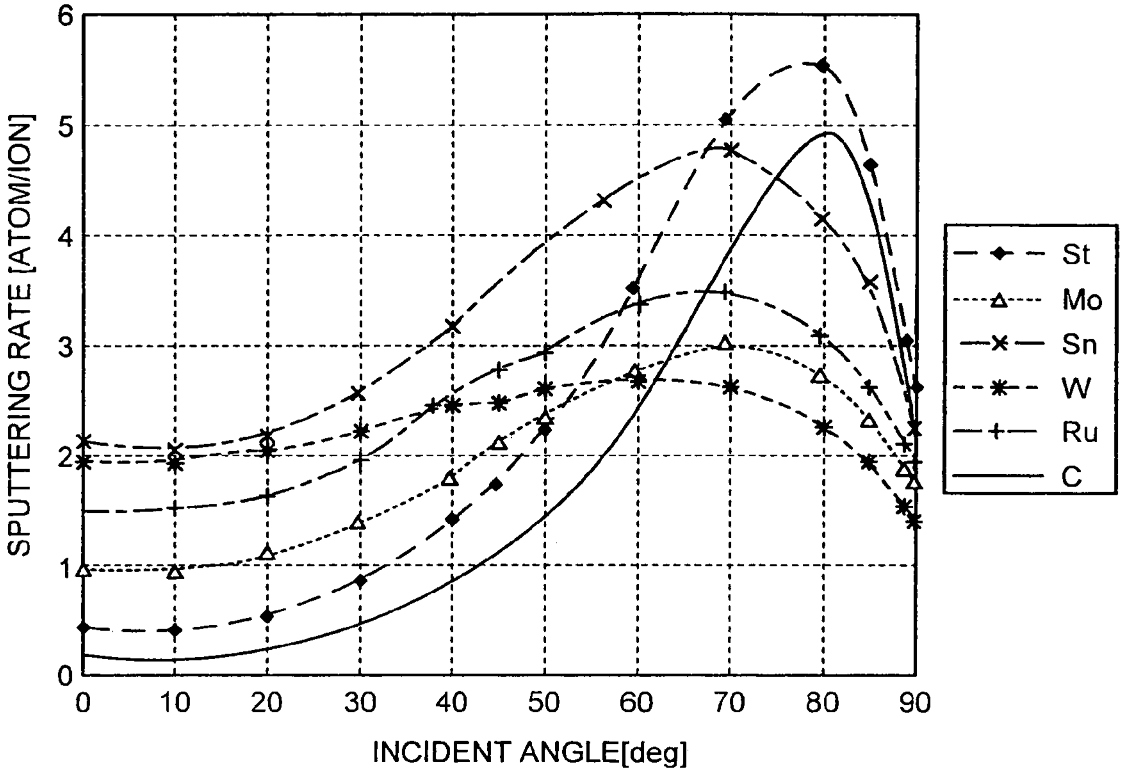
FIG. 8 is a diagram illustrating a dependency of sputtering rate on incident angle when the energy of Sn ion is 1 keV.

Furthermore, as illustrated in FIG. 8, the sputtering rate of ion debris is dependent on the incident angle of ion debris with respect to the surface Sa of the ion collection plate 22. FIG. 8 is a graph illustrating the dependency of sputtering rate on the incident angle when the energy of Sn ion is 1 keV. Hence, in the first embodiment, the inclination angle θ of the surface Sa of the ion collection plate 22 with respect to a plane vertical to the central axis C is made equal to or smaller than 20 degrees. This enables reduction of sputtering rate and allows the ion collection plate to receive ion debris more securely.

Second Embodiment

Figure 9:
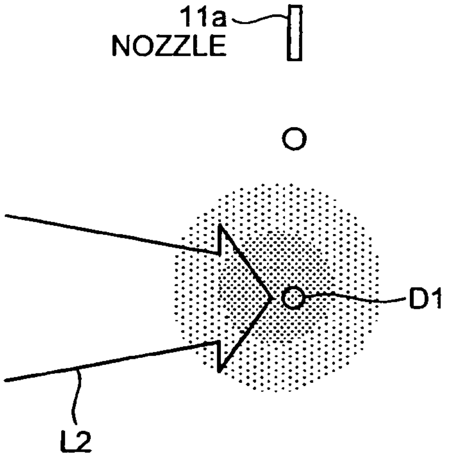
FIG. 9 is a diagram illustrating a 10 μm droplet as an example of mass-limited target according to a second embodiment of the present invention.

In the first embodiment described above, the multi-step irradiation including the process for generating the pre-plasma is adopted for the reduction of initial energy of Sn ion. In a second embodiment, a mass-limited target is employed as a target for the reduction of initial energy of a target atom discharged as debris. Here, "mass-limited target" refers to a target which has a minimum required mass for generating a desirable EUV light. For example, a mass-limited target illustrated in FIG. 9 is a droplet D1 having a diameter of 10 μm. The intensity of the EUV generation laser light can thus be lowered, and as a result, the initial energy of generated Sn ion can be lowered. Specifically, Sn density has to be about 1 to $5\times10^{18}$ $cm^{-3}$ for EUV light conversion efficiency of 4%. To satisfy this condition, it is sufficient if the diameter of the droplet D1 of a liquid Sn ejected from a nozzle 11*a* is 10 μm. When the diameter of the droplet D1 is 10 μm, a required power of the EUV generation laser light L2 is about $10^{10}$ W/$cm^2$. When the mass-limited target is used in combination with the multi-step irradiation mentioned earlier, the Sn ion energy can further be lowered.

Figure 10:
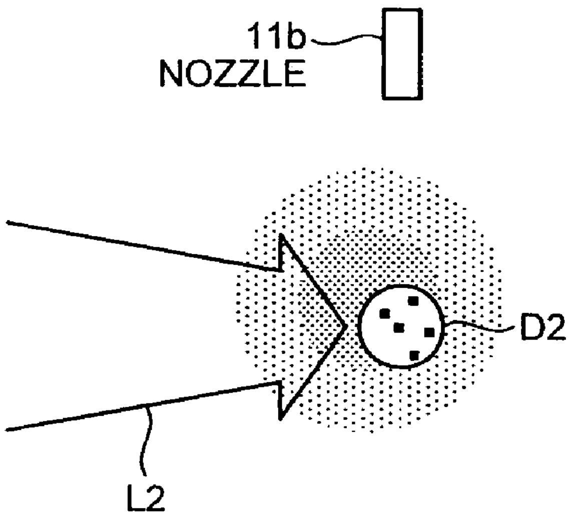
FIG. 10 is a diagram illustrating a target containing nano-particles as an example of mass-limited target according to the second embodiment of the present invention.

Alternatively, the mass-limited target can be a nanoparticle-containing target D2 as illustrated in FIG. 10. The nanoparticle-containing target D2 is generated by mixing Sn particles of nano-size into water or alcohol and ejecting the mixture from a nozzle 11*b*. With this, the mass of the target can further be reduced. Since the mass of the target is a minimum required mass for the generation of a desirable EUV light, the required intensity of the EUV generation laser light can be lowered, and as a result, the energy of generated Sn ion can further be lowered.

Figure 11:
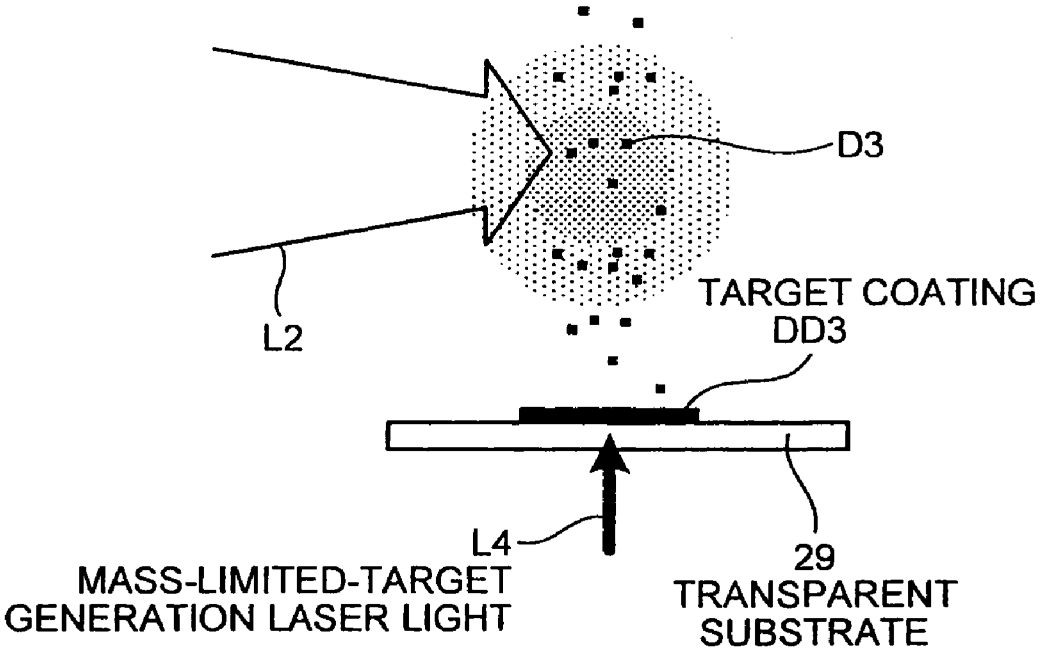
FIG. 11 is a diagram illustrating a target as an example of mass-limited target according to the second embodiment of the present invention.

Alternatively, a mass-limited target D3 as illustrated in FIG. 11 may be used. The mass-limited target D3 can be generated by forming a target coating DD3 which is an Sn coating on the surface of a transparent substrate 29, and irradiating the transparent substrate 29 from its back surface with a mass-limited-target generation laser light L4. By this arrangement, Sn of the target coating DD3 is stripped off and the mass-limited target D3 is generated. The stripped-off Sn flies upward from the surface of the transparent substrate 29 in the state of Sn fine particles having minimum required mass for the generation of a desirable EUV light. Thus, the mass-limited target D3 which is Sn fine particle having the minimum required mass for the generation of EUV light is generated and diffused. Thereafter, a group of generated, diffused mass-limited targets D3 is irradiated with the EUV generation laser light L2 and the EUV light is generated. Because the mass of the target is the minimum required mass for the generation of an EUV light, the required intensity of the EUV generation laser light L2 can further be lowered, and as a result, the energy of generated Sn ion can further be reduced.

Third Embodiment

Figure 12:
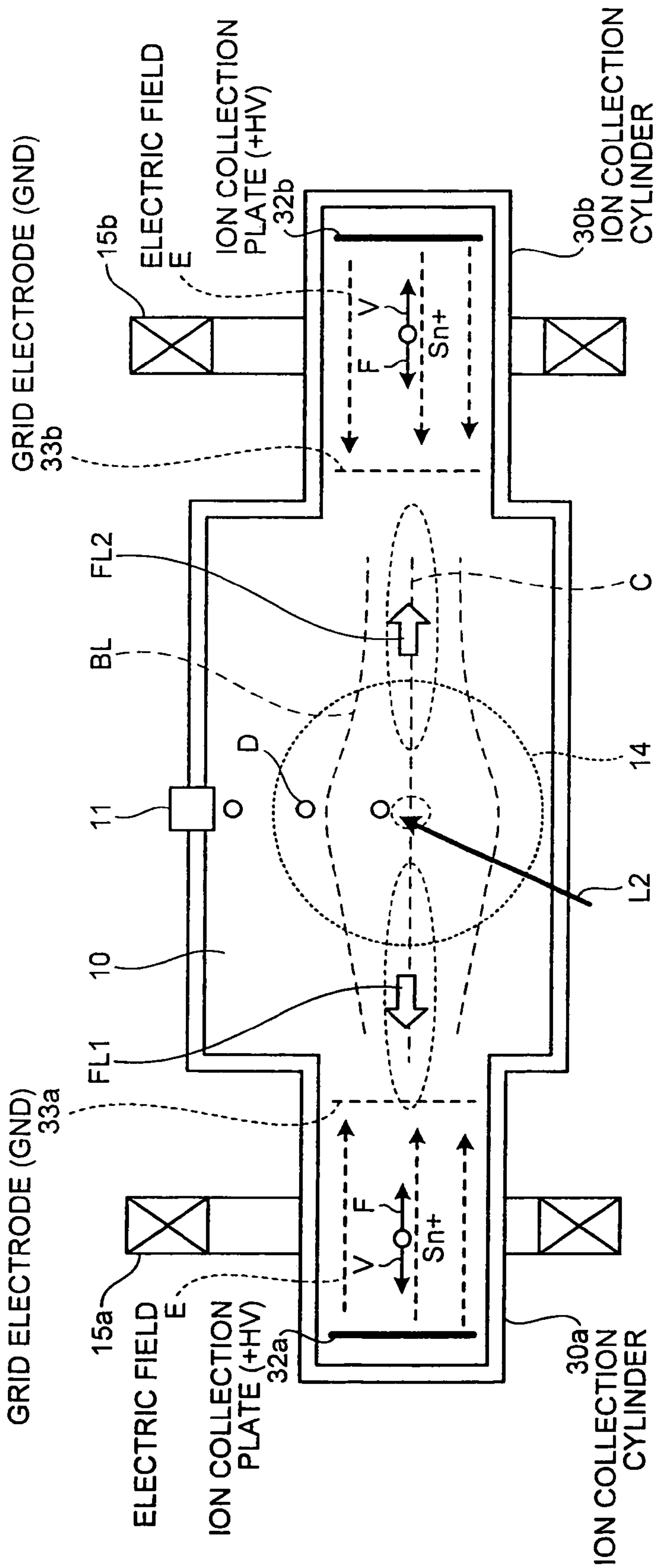
FIG. 12 is a sectional view illustrating a configuration of an extreme ultraviolet light source apparatus according to a third embodiment of the present invention.

A third embodiment of the present invention will be described. FIG. 12 is a sectional view illustrating a configuration of an extreme ultraviolet light source apparatus according to the third embodiment of the present invention. In the third embodiment, a pair of mutually opposing ion collection cylinders 30*a* and 30*b* is arranged on the central axis C of the magnetic field. The pair of ion collection cylinders 30*a* and 30*b* collects Sn ion which converges along the central axis C of the magnetic field and moves as ion flows FL1 and FL2. The ion collection cylinders 30*a* and 30*b* respectively include grounded grid electrodes 33*a* and 33*b* arranged at the side of incident Sn ion and ion collection plates 32*a* and 32*b* arranged at the bottom side and to which a high positive potential is applied. With this configuration, the velocity of incoming Sn ion is decreased by an electric field E applied between the grid electrode 33*a* and the ion collection plate 32*a* and between the grid electrode 33*b* and the ion collection plate 32*b*, and therefore, the energy of Sn ion at the time of collision with the ion collection plates 32*a* and 32*b* can be decreased. That is, incoming positive Sn ion loses its velocity due to Coulomb's force, and the energy of Sn ion is lowered. Thus, the sputtering rate on the collision surface of the ion collection plates 32*a* and 32*b* can be reduced. When the EUV light is directly generated by irradiating the droplet D with the EUV generation laser light L2 to generate plasma, the generated Sn ion move towards two opposite sides of the central axis C of the magnetic field. Hence, in the third embodiment, two ion collection cylinders 30*a* and 30*b* are provided.

In the third embodiment, Mo which has a low sputtering rate is arranged on the collision surface of the ion collection plates 32*a* and 32*b*. When Mo is used in the collision surface or when Si is used as in the first embodiment described above, damages from sputtered materials can be reduced even when these materials are sputtered by Sn ion and fly in the vacuum chamber 10, because Mo and Si are also materials forming the EUV light reflective multilayer coating of the EUV collector mirror 14.

As described above, in the third embodiment, the velocity of Sn ion entering the ion collection cylinders 30*a* or 30*b* is reduced by the electric field, and therefore, the energy of Sn ion colliding with the collision surface of the ion collection plates 32*a* or 32*b* can be reduced. As a result, the sputtering of the collision surface by the Sn ion can be prevented.

Fourth Embodiment

A fourth embodiment of the present invention will be described. In the fourth embodiment, a slow ion-flow target is generated and irradiated with the EUV generation laser light to generate an EUV light. When the slow ion-flow target is employed, the energy of generated Sn ion can be reduced.

Figure 13:
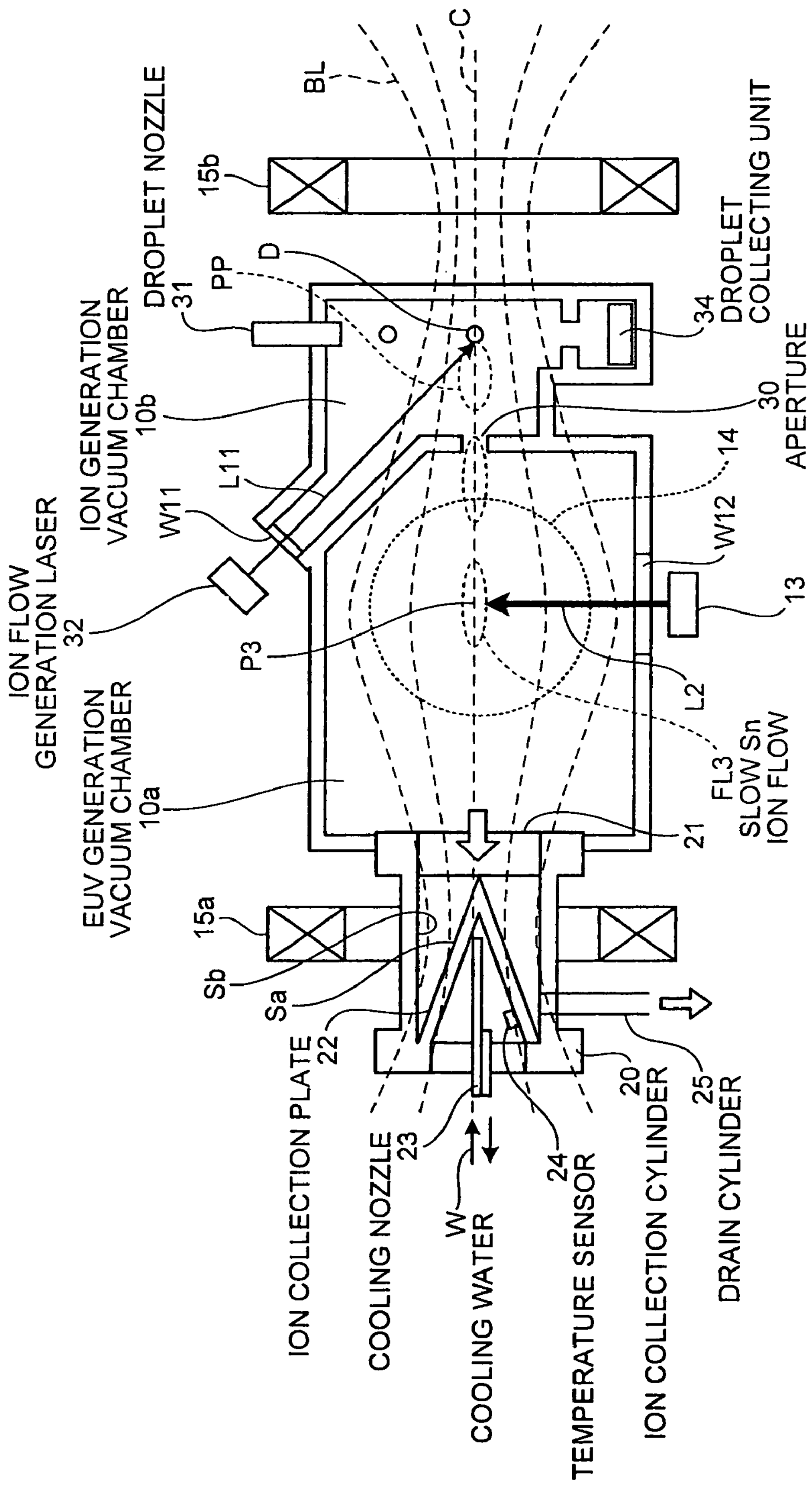
FIG. 13 is a sectional view illustrating a configuration of an extreme ultraviolet light source apparatus according to a fourth embodiment of the present invention.

As illustrated in FIG. 13, an extreme ultraviolet light source apparatus according to the fourth embodiment includes an ion generation vacuum chamber 10*b* and an EUV generation vacuum chamber 10*a* as the vacuum chamber. The ion generation vacuum chamber 10*b* and the EUV generation vacuum chamber 10*a* are arranged adjacent to each other and are communicated with each other through an aperture 30 which is on the central axis C of the magnetic field.

Inside the ion generation vacuum chamber 10*b*, a droplet nozzle 31 is arranged. From the droplet nozzle 31, a droplet D of molten Sn is ejected toward the inside of the ion generation vacuum chamber 10*b*. Furthermore, in the ion generation vacuum chamber 10*b*, a window W11 is provided to let an ion flow generation laser light L11 outputted from an ion flow generation laser 32 pass through. The droplet D is irradiated with the ion flow generation laser light L11 through the window W11. The irradiation of the droplet D with the ion flow generation laser light L11 generates the pre-plasma PP. The position where the pre-plasma PP is generated is near the central axis C of the magnetic field. Because the ion flow generation laser light L11 is radiated from the side of the ion collection cylinder 20, the pre-plasma PP is generated at the side of the ion collection cylinder 20 with respect to the droplet D. Thereafter, the pre-plasma PP converges near the central axis C of the magnetic field and moves along the central axis C towards the side of the ion collection cylinder 20.

The pre-plasma PP contains, other than Sn ion, uncharged debris such as fine particles and neutral particles. Because the uncharged debris are not acted by the magnetic field, these diffuses within the ion generation vacuum chamber 10*b*. Here, at a position opposing the droplet nozzle 31, a droplet collecting unit 34 is arranged for collecting the remaining droplet.

The Sn ion, which moves along the central axis C toward the side of the ion collection cylinder 20, moves into the EUV generation vacuum chamber 10*a* through the aperture 30. The aperture 30 has a substantially identical diameter with the diameter of the moving flux of Sn ion and is sufficiently small. Therefore, most of the above-mentioned diffusing debris such as fine particles and neutral particles cannot enter the EUV generation vacuum chamber 10*a*. In addition, even when the debris enter the EUV generation vacuum chamber 10*a* through the aperture 30, most of the debris can be collected by the ion collection cylinder 20, because the movement of the debris has a directionality. As a result, the adherence of debris to the EUV collector mirror 14 and other elements can be prevented.

The EUV generation vacuum chamber 10*a* has a window W12. The EUV generation laser light L2 outputted from an EUV generation laser 13 comes into the EUV generation vacuum chamber 10*a* through the window W12. A focusing position of the EUV collector mirror 14 is arranged on the central axis C. The EUV generation laser light L2 is radiated at the timing when the slow Sn ion flow FL3, which moves along the central axis C, reaches a focusing position P3. Thus, the EUV light as well as Sn ion are generated.

Figure 14:
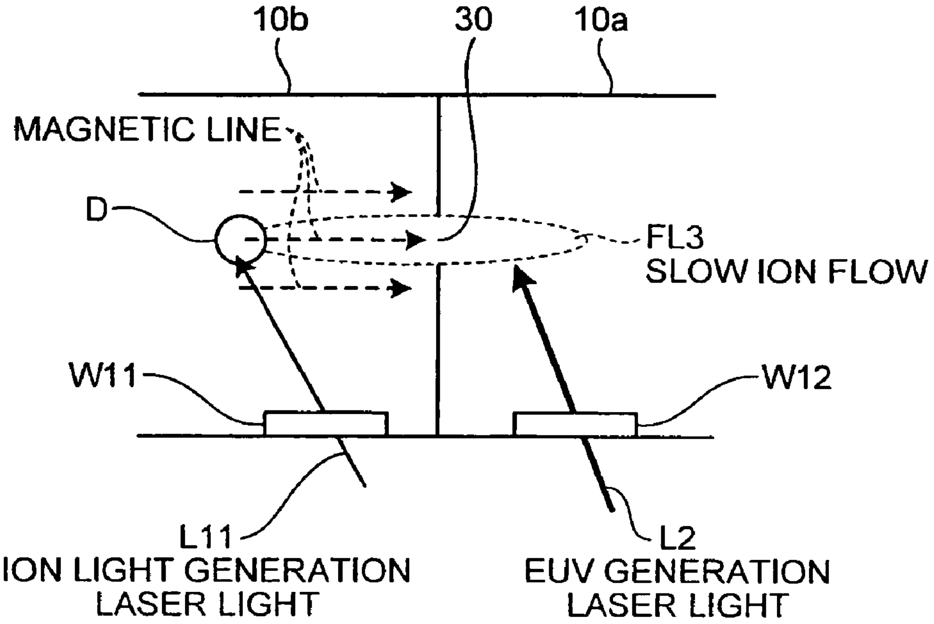
FIG. 14 is a schematic view illustrating a configuration for controlling an ion flow using a magnetic force according to the fourth embodiment of the present invention.

FIG. 14 schematically illustrates the movement of Sn ion from the ion generation vacuum chamber 10*b* to the EUV generation vacuum chamber 10*a* caused by the magnetic field mentioned above. Most of the slow Sn ion flow FL3 are Sn ions. Therefore, it is sufficient if the low-power EUV generation laser light L2 which has a required intensity only for the generation of EUV light is radiated on the slow Sn ion as a target. Therefore, the energy of generated Sn ion can be lowered. Thus, the energy of Sn ion reaching the ion collection plate 22 of the ion collection cylinder 20 is, for example, less than 0.5 keV, and the sputtering rate of the collision surface can be less than one.

Figure 15:
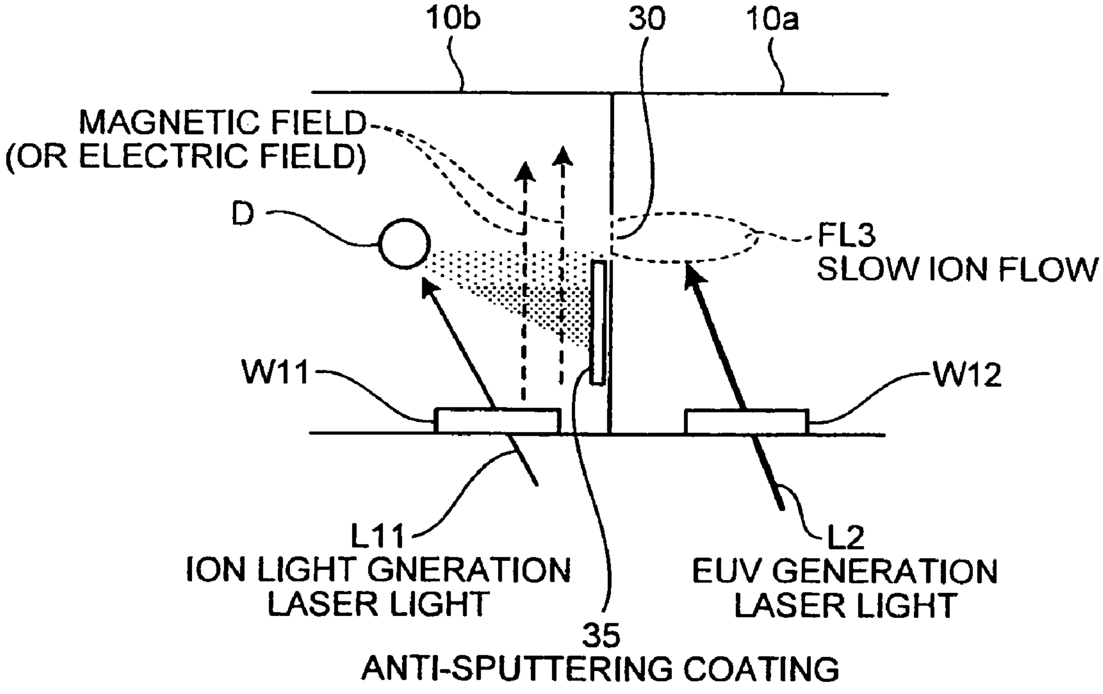
FIG. 15 is a schematic view illustrating a configuration for taking out only the slow ion according to the fourth embodiment of the present invention.
Figure 16:
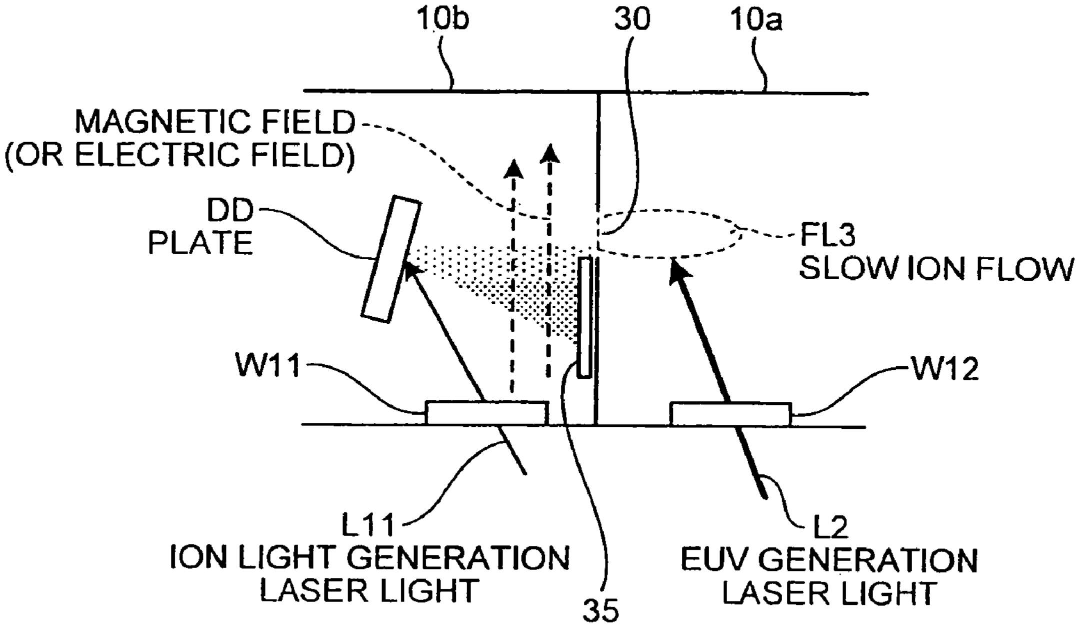
FIG. 16 is a schematic view illustrating a configuration for taking out only the slow ion when the target is a solid target according to the fourth embodiment of the present invention.

As a technique for causing only the slow ion enter the EUV generation vacuum chamber 10*a*, a technique other than the technique using the magnetic field generated by the magnets 15*a* and 15*b* to make slow Sn ion converge and move can be used. For example, a magnetic field or an electric field may be generated in a direction vertical to the flow direction of the slow ion flow FL3 in the ion generation vacuum chamber 10*b* as illustrated in FIG. 15 to separate heavy non-ionized debris from slow Sn ion, and the aperture 30 may be formed at a position where the slow Sn ion is separated. According to such a technique, the separated Sn ion moves directly and linearly into the EUV generation vacuum chamber 10*a* through the aperture 30 to form the slow ion flow FL3. In this case, an anti-sputtering coating 35 may preferably be formed at a position where the non-ionized debris are separated and diffused to capture the non-ionized debris. In FIG. 15, an example using a droplet as a target is illustrated. However, this example should not be taken as limiting. For example, a solid target such as a plate DD can similarly be used as illustrated in FIG. 16. The solid target can be, other than the plate, wire and ribbon, as mentioned earlier.

As described above, the configuration according to the fourth embodiment includes the ion generation vacuum chamber 10*b* for taking out only the Sn ion and a structure for irradiating only the Sn ion taken from the ion generation vacuum chamber 10*b* with the EUV generation laser light L2 to generate and output the EUV light, and therefore, the energy of generated Sn ion can be reduced, and as a result, the sputtering rate of the collision surface can be made less than one.

Fifth Embodiment

Figure 17:
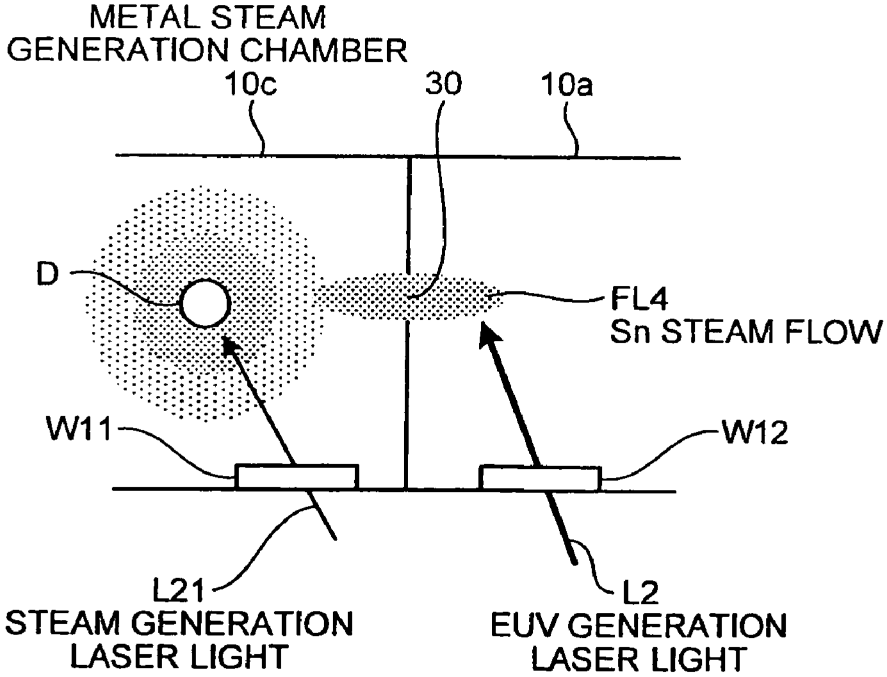
FIG. 17 is a schematic view illustrating a configuration for generating a target steam and ejecting a target steam flow according to a fifth embodiment of the present invention.

In the fourth embodiment described above, the plasma is generated inside the ion generation vacuum chamber 10*b*, and only the Sn ions are taken out from the plasma to be introduced into the EUV generation vacuum chamber 10*a* for the generation and output of the EUV light. Meanwhile, in a fifth embodiment, the droplet D is irradiated with a steam generation laser light L21 in a metal steam generation chamber 10*c* to evaporate Sn, which is a target material, as illustrated in FIG. 17. Steam diffusion causes the evaporated Sn steam to flow into the EUV generation vacuum chamber 10*a* through the aperture 30 as an Sn steam flow FL4.

The Sn steam flow FL4 flowing into the EUV generation vacuum chamber 10*a* is irradiated with the EUV generation laser light L2. Thus, the EUV light as well as Sn ion are generated. In this case, because the Sn irradiated with the EUV generation laser light L2 is gaseous, laser intensity required for the EUV light generation can be low. As a result, the energy of generated Sn ion can be reduced. Thus, the sputtering of the collision surface of the ion collection cylinder 20 can be prevented. The aperture 30, which has a small diameter, can guide only the steam that has a certain directionality in the generated Sn steam to the EUV generation vacuum chamber. Thereby, the Sn steam flow FL4 moves with a certain directionality within the EUV generation vacuum chamber 10*a*.

Figure 18:
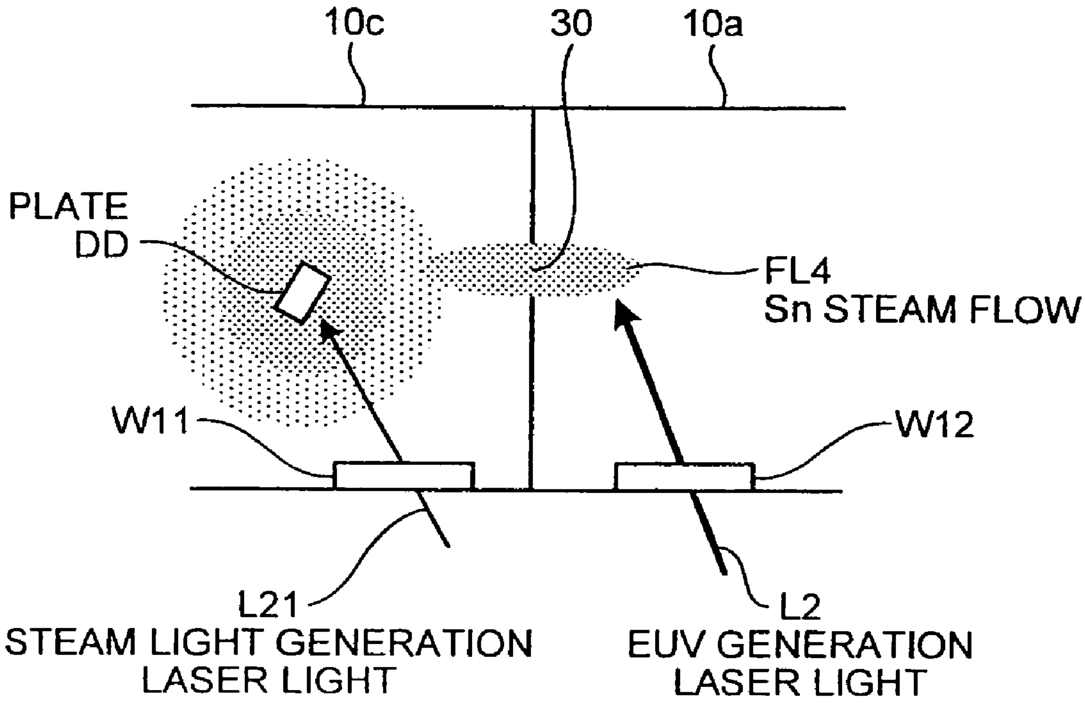
FIG. 18 is a schematic view illustrating a configuration for generating a target steam and ejecting a target steam flow using a solid target according to the fifth embodiment of the present invention.

FIG. 17 illustrates an example where a droplet D of molten Sn is used as a target. However, this example should not be taken as limiting. For example, as illustrated in FIG. 18, the Sn steam flow FL4 can be generated when the plate DD, i.e., a solid target, is employed. In the fifth embodiment, the target material is irradiated with the steam generation laser light L21 for the generation of Sn steam. However, not being limited to the embodiment, various techniques can be employed for the generation of Sn steam; for example, Sn steam may be generated by causing the target material to evaporate using the heat supplied from a heat source without using the laser light.

Sixth Embodiment

A sixth embodiment of the present invention will be described. In the sixth embodiment, a gas region is formed as a previous stage of the ion collection cylinder, or a previous stage of the ion collection plate in the ion collection cylinder, so as to collide with the Sn ion. Because the gas region can decelerate the Sn ion, the energy of Sn ion at the time of collision can be reduced, and the sputtering at the collision surface can be prevented.

Figure 19:
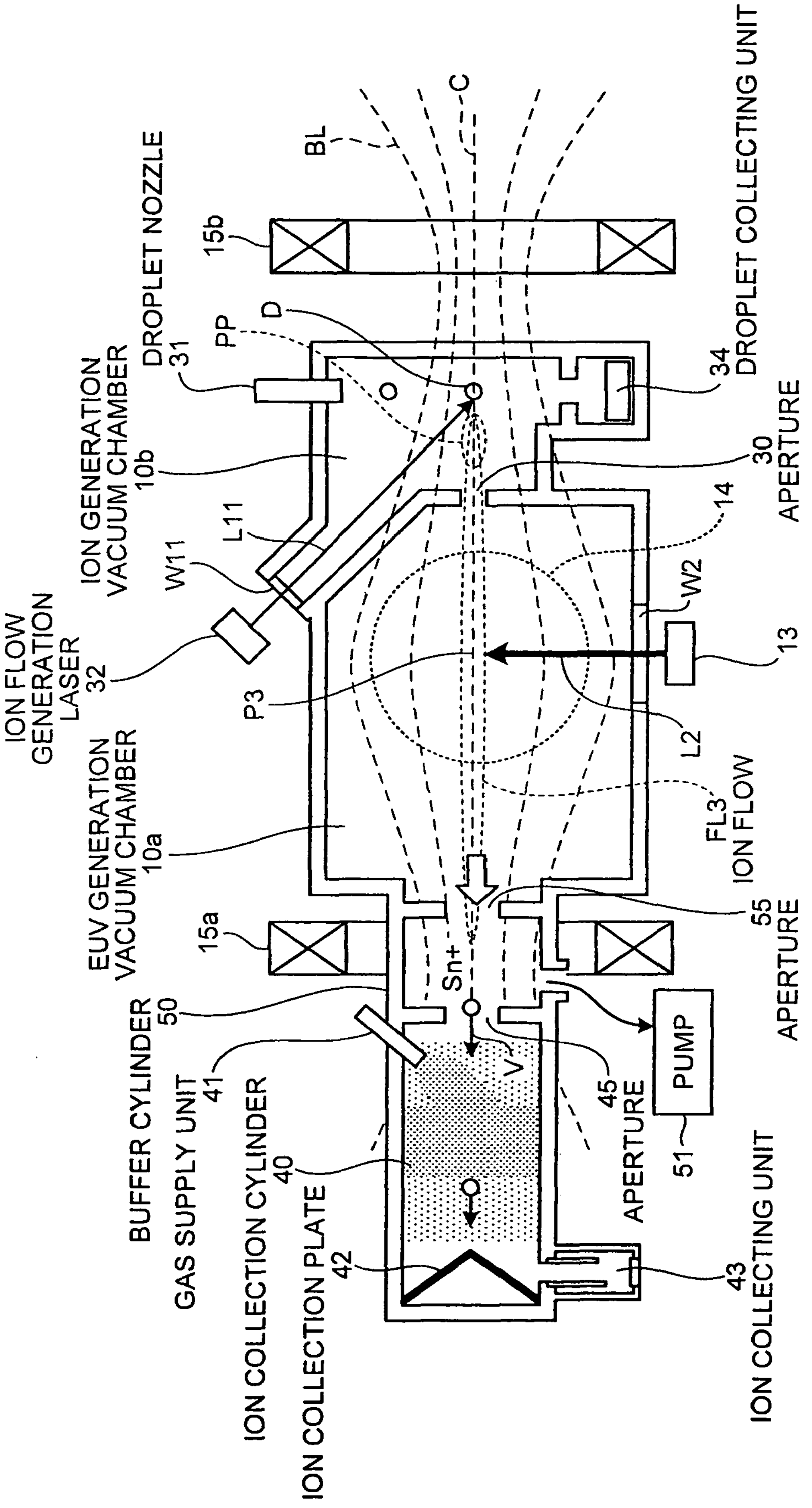
FIG. 19 is a sectional view illustrating a configuration of an extreme ultraviolet light source apparatus according to a sixth embodiment of the present invention.

FIG. 19 is a sectional view illustrating a configuration of an extreme ultraviolet light source apparatus according to the sixth embodiment of the present invention. In the sixth embodiment, an ion collection cylinder 40 having a gas region is provided in place of the ion collection cylinder 20 illustrated in FIG. 13, and further, a buffer cylinder 50 is arranged between the EUV generation vacuum chamber 10*a* and the ion collection cylinder 40.

The shape of the ion collection cylinder 40 is cylindrical, similarly to the ion collection cylinder 20. Furthermore, the ion collection cylinder 40 has an aperture 45 formed at the side of the EUV generation vacuum chamber 10*a*. Still further, the ion collection cylinder 40 has a conic ion collection plate 42 and ion collecting unit 43 which correspond to the ion collection plate 22 and the collecting unit 26 shown in FIG. 2, respectively. On the surface of the ion collection plate 42 and the inner wall surface of the ion collection cylinder 40, Si coating is formed as a low-sputtering coating. In a space demarcated by the surface of the ion collection plate 42 and the inner wall surface of the ion collection cylinder 40, the gas region is formed and filled with a gas such as a rare gas. The incoming Sn ion from the aperture 45 collides with the rare gas and loses its energy, whereby the velocity of Sn ion is reduced. Therefore, the surface of the ion collection plate 42 and other elements are less likely to be sputtered by Sn ion.

The ion collection cylinder 40 is filled with a rare gas by a gas supply unit 41. The gas in the gas region is not limited to a rare gas. Atoms or molecules of hydrogen or halogen or gas mixture of these may be used.

As described above, the buffer cylinder 50 is arranged between the EUV generation vacuum chamber 10*a* and the ion collection cylinder 40. The Sn ion moves into the ion collection cylinder 40 via the buffer cylinder 50 having an aperture 55. In the buffer cylinder 50, the gas supplied from the gas supply unit 41 is subjected to differential pumping by a pump 51 which prevents the entrance of gas into the EUV generation vacuum chamber 10*a*.

Figure 20:
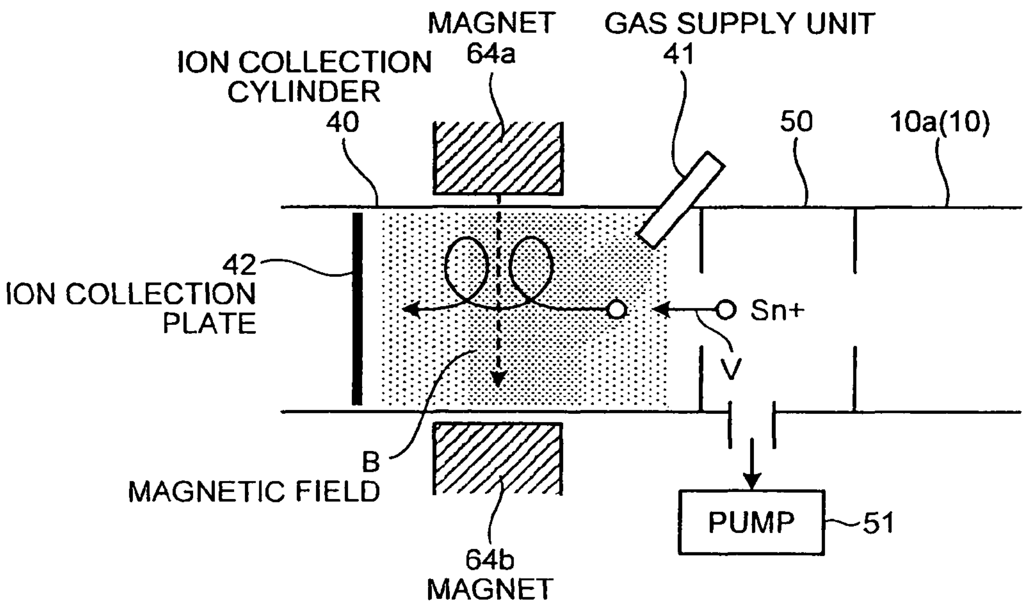
FIG. 20 is a diagram illustrating a configuration for increasing the number of collisions between ion and gas according to the sixth embodiment of the present invention.

The length of the gas region in the direction of central axis C is preferably as long as possible. Because when the gas region is long, the number of collisions between the Sn ion and the gas can be increased, and as a result, the Sn ion can be decelerated by a large degree. However, a longer gas region makes the ion collection cylinder 40 longer. Hence, preferably, as illustrated in FIG. 20, a pair of magnets 64*a* and 64*b* is arranged in a direction perpendicular to the Sn ion flow to apply a magnetic field B to the gas region. Thus, Sn ion can be moved while rotated by Lorentz force. In this case, the track of the movement of Sn ion is spiral, and hence, the moving distance of Sn ion can be made long even when the gas region is short. Thus, the number of collisions between the gas and the Sn ion can be increased.

As described above, in the sixth embodiment, the gas region colliding with the Sn ion is provided as the previous stage to the ion collection cylinder or as the previous stage to the ion collection plate in the ion collection cylinder, and therefore, the Sn ion coming into the ion collection cylinder can be decelerated. Thus, the energy of Sn ion hitting the ion collection plate can be lowered, and the sputtering on the collision surface can be prevented.

Seventh Embodiment

Figure 21:
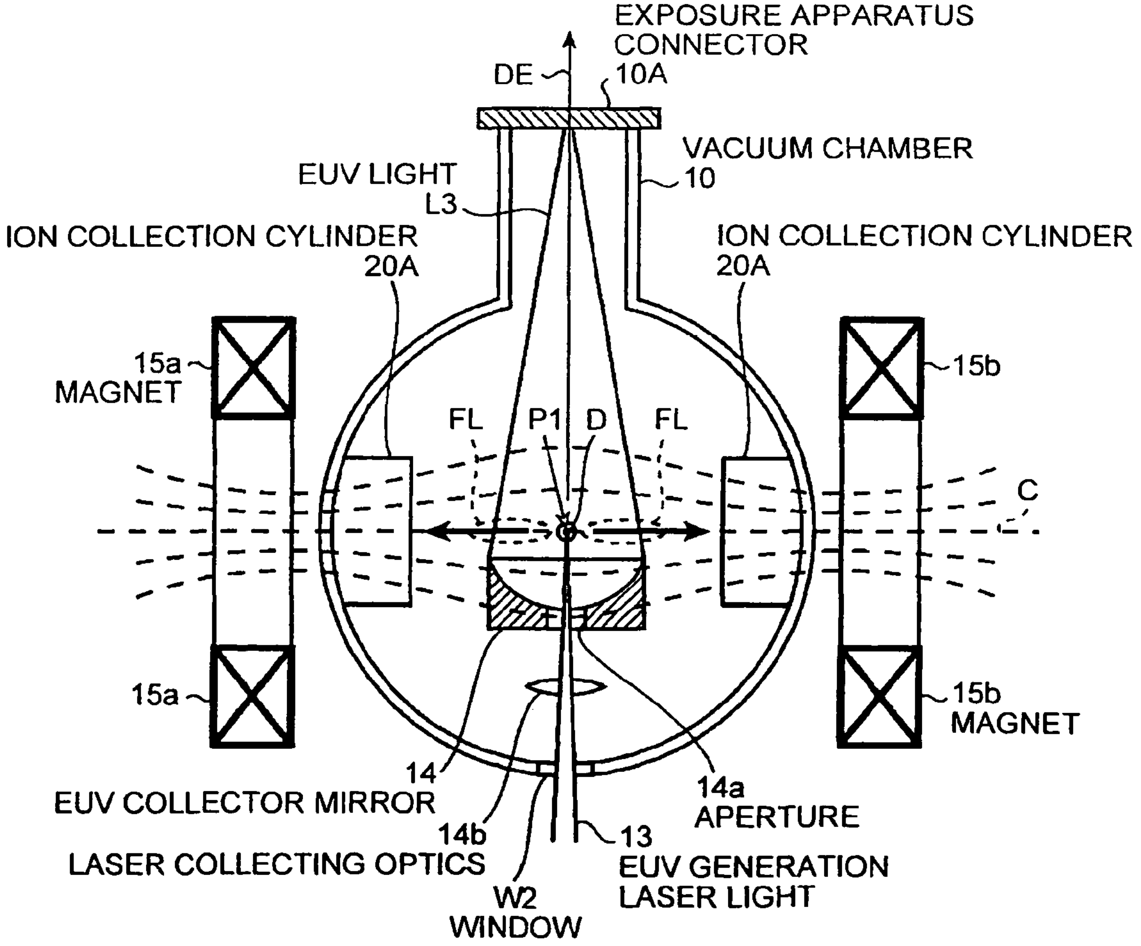
FIG. 21 is a sectional view illustrating a configuration of an extreme ultraviolet light source apparatus according to a seventh embodiment of the present invention.

A seventh embodiment of the present invention will be described in detail with reference to drawings. FIG. 21 is a sectional view illustrating a configuration of an extreme ultraviolet light source apparatus according to the seventh embodiment of the present invention. Note that, FIG. 21 illustrates a section of the extreme ultraviolet light source apparatus on a plane including both an output direction DE of the EUV light L3 and the central axis C of the magnetic field generated by the magnets 15*a* and 15*b*.

In the embodiments described above, examples where the ion collection cylinder 20, 30*a*/30*b*, or 40 is arranged outside the vacuum chamber 10 are described. On the other hand, in the seventh embodiment, ion collection cylinders 20A are arranged in the vacuum chamber 10. Hence, in the seventh embodiment, as illustrated in FIG. 21, the magnets 15*a* and 15*b* are arranged outside the vacuum chamber 10 so that a magnetic field generated by the magnets 15*a* and 15*b* has a central axis C which is vertical to the output direction DE of the EUV light L3 and passing through a plasma luminescence site P1. The pair of ion collection cylinders 20A is so arranged that the plasma luminescence site P1 is arranged between the ion collection cylinders 20A and the central axis C coincides with the incoming direction of ion debris. FIG. 21 illustrates an example where the pair of ion collection cylinders 20A is used. However, the example is not limiting, and only one ion collection cylinder 20A may be provided.

When the droplet D is irradiated at the plasma luminescence site P1 with the EUV generation laser light 13 from the backside of the EUV collector mirror 14 via the window W2 of the vacuum chamber 10, laser focusing optics 14*b*, and an aperture 14*a* of the EUV collector mirror 14, the droplet D, which has turned into plasma, radiates the EUV light L3, and at the same time, ion debris are generated around the plasma luminescence site P1. The positively-charged ion debris converge and form an ion flow FL because of the magnetic field generated by the magnets 15*a* and 15*b*, to move along the central axis C. Then, the ion debris are collected by the ion collection cylinders 20A arranged on the central axis C. The ion collection cylinder 20A can be any of the ion collection cylinders 20, 30*a*, 30*b*, and 40 according to the first to sixth embodiments. The EUV light L3 radiated at the plasma luminescence site P1 from the droplet D, which has turned into plasma, is reflected by the EUV collector mirror 14 and focused in the output direction DE, and outputted through an exposure apparatus connector 10A.

When the ion collection cylinder 20A is arranged inside the vacuum chamber 10, the extreme ultraviolet light source apparatus can be downsized, and further, it becomes possible to take out the vacuum chamber 10 without moving the magnets 15*a* and 15*b*. As a result, the maintenance of the vacuum chamber 10, for example, can be simplified. Other structures, operations, and effects are the same as those illustrated in relation to the above embodiments/variations, and hence, detailed description will not be repeated.

Eighth Embodiment

Figure 22:
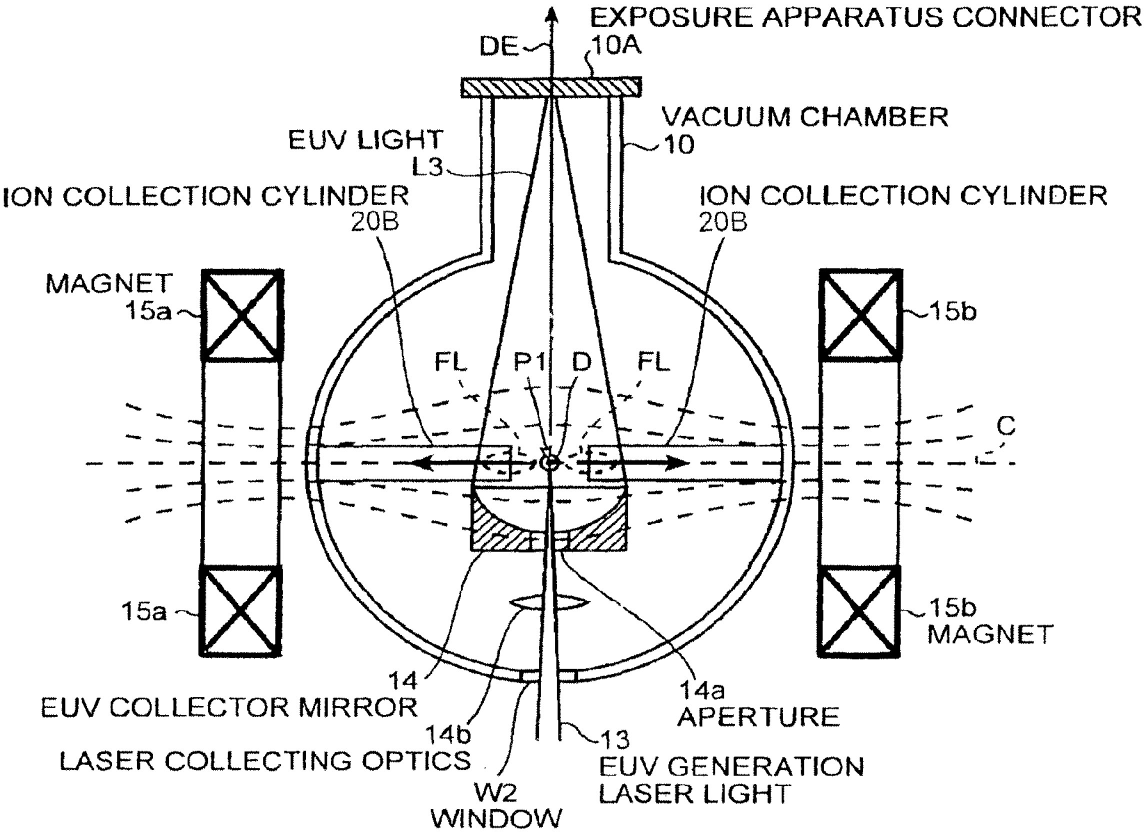
FIG. 22 is a sectional view illustrating a configuration of an extreme ultraviolet light source apparatus according to an eighth embodiment of the present invention.
Figure 23:
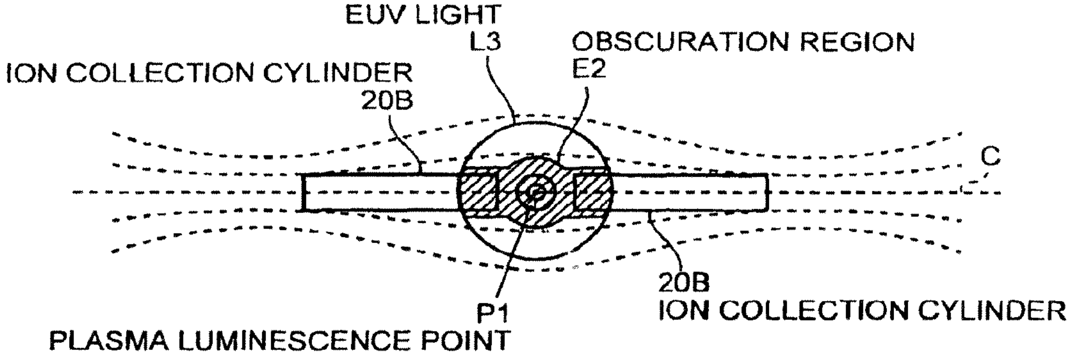
FIG. 23 is a schematic view illustrating a relation between an obscuration region and an ion collection cylinder according to the eighth embodiment of the present invention.

An eighth embodiment of the present invention will be described in detail with reference to drawings. FIG. 22 is a sectional view illustrating a configuration of an extreme ultraviolet light source apparatus according to the eighth embodiment. FIG. 23 is a schematic view illustrating a positional relation between an obscuration region and an ion collection cylinder in the eighth embodiment.

As illustrated in FIG. 22, the extreme ultraviolet light source apparatus according to the eighth embodiment has a similar configuration to that of the extreme ultraviolet light source apparatus illustrated in FIG. 22 except that the pair of ion collection cylinders 20A is replaced with a pair of ion collection cylinders 20B. The ion collection cylinders 20B are so arranged, in a similar manner to the arrangement of the ion collection cylinder 20A, that the plasma luminescence site P1 is placed between the ion collection cylinders 20B and the central axis C coincides with the incoming direction of ion debris. In the eighth embodiment, the ion collection cylinders 20B are arranged in the vacuum chamber 10 such that at least a part (head) of the ion collection cylinder 20B is located within an obscuration region E2, which is a shadow region of the EUV light L3 as illustrated in FIG. 23. Here, “obscuration region” refers to a region corresponding to an angle range of the EUV light L3 collected by the EUV collector mirror 14 but not utilized by an exposure apparatus. More specifically, in the description, the obscuration region E2 is a three-dimensional volume region corresponding to an angle range of light not utilized for exposure by an exposure apparatus. When the ion collection cylinder 20B is arranged within the obscuration region E2 which does not contributes to the exposure of the EUV exposure apparatus, influence on the exposure performance and the throughput of the exposure apparatus can be avoided.

When the ion collection cylinder 20B is arranged such that at least a part (head) of the ion collection cylinder 20B is arranged in the obscuration region E2, a position where the ion debris are generated (near the plasma luminescence site P1) can be arranged close to the opening of the ion collection cylinder 20B. Therefore, ion debris can be collected more efficiently and securely. Other structures, operations, and effects are the same as those of the seventh embodiment, and detailed description will not be repeated. FIGS. 22 and 23 illustrate an example where the ion collection cylinders 20B are employed. However, the example should not be taken as limiting, and only one ion collection cylinder 20B may be provided. In addition, each of the ion collection cylinders 20B can be any one of the ion collection cylinders 20, 30*a*, 30*b*, and 40 according to the first to sixth embodiments.

Ninth Embodiment

Figure 24:
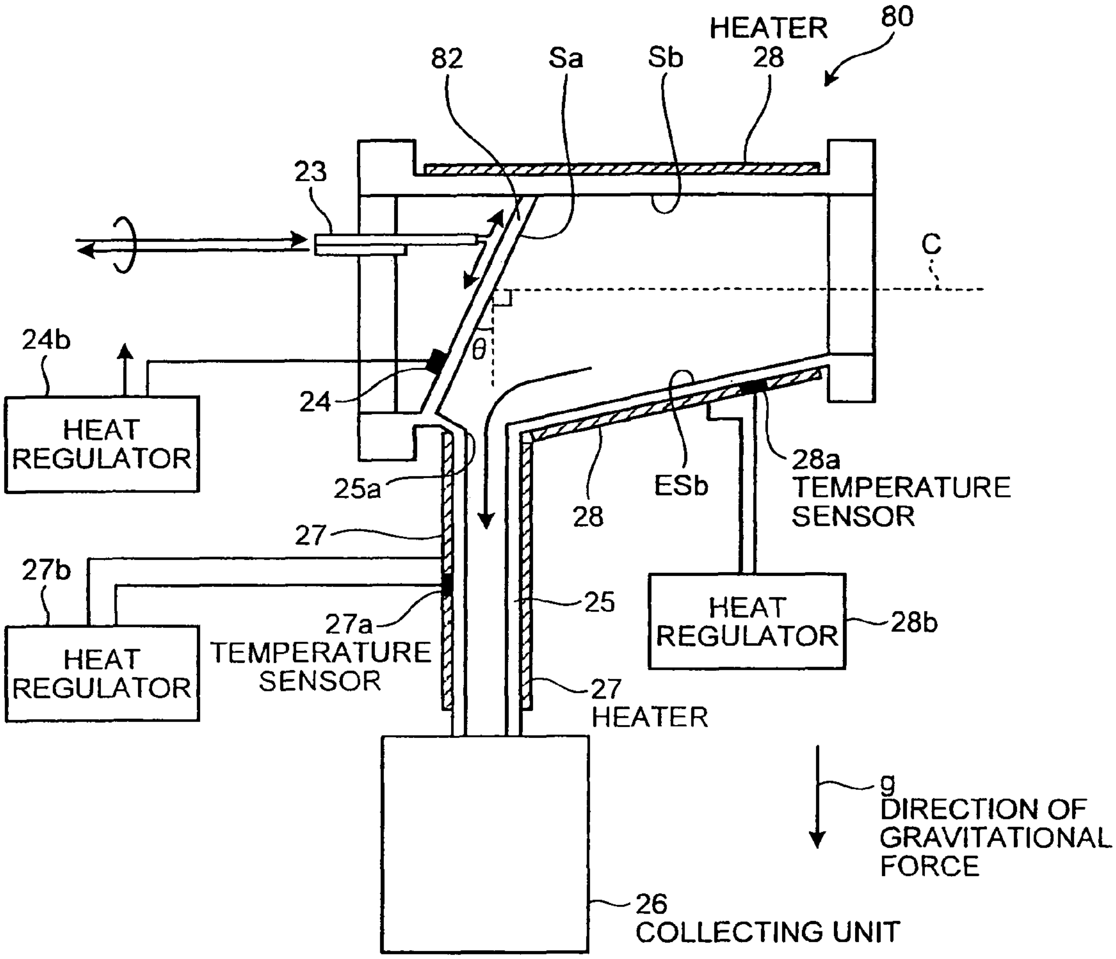
FIG. 24 is a sectional view illustrating a configuration of an ion collection cylinder according to a ninth embodiment of the present invention.

A ninth embodiment of the present invention will be described in detail with reference to drawings. In the ninth embodiment, another figuration of the ion collection cylinders according to the embodiments will be illustrated. FIG. 24 is a sectional view illustrating a configuration of an ion collection cylinder 80 according to the ninth embodiment. The embodiments described heretofore employ the ion collection cylinder 20, 30*a*/30*b*, or 40 in which the conic ion collection plate 22 or 42, or the plate-shaped ion collection plate 32*a* or 32*b* is arranged at the bottom. In the ninth embodiment, the ion collection cylinder 80 as illustrated in FIG. 24 is employed.

As illustrated in FIG. 24, the ion collection cylinder 80 according to the ninth embodiment includes a plate-shaped ion collection plate 82 whose ion collision surface is inclined with respect to a plane vertical to the central axis C of the magnetic field. Thus, the collection can be facilitated with the use of gravitational force, while the incident angle of ion debris FI with respect to the ion collection plate 82 is reduced to, for example, an angle equal to or smaller than 20 degrees and the sputtering rate is maintained at a low level. The ion collection plate 82 of the ninth embodiment is plate-shaped, and hence, easy to process and can be manufactured at low cost in comparison with the conic ion collection plate 22 of the first embodiment. Other structures, operations, and effects are the same as those of the embodiments described above, and detailed description will not be repeated.

Tenth Embodiment

Figure 25:
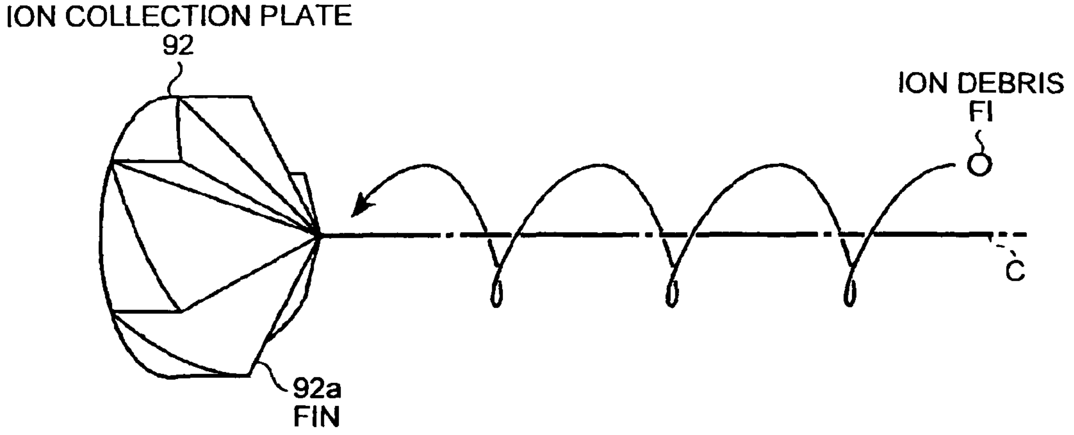
FIG. 25 is a schematic view illustrating a configuration of an ion collection plate according to a tenth embodiment of the present invention.

A tenth embodiment of the present invention will be described in detail with reference to drawings. The tenth embodiment illustrates still another figuration of the ion collection plate of the embodiments described above. FIG. 25 is a schematic view illustrating a configuration of an ion collection plate 92 according to the tenth embodiment. The embodiments described heretofore employ the conic ion collection plate 22 or 42, or the plate-shaped ion collection plate 32*a*, 32*b*, or 82. In the tenth embodiment, the ion collection plate 92 as illustrate in FIG. 25 is employed.

As illustrated in FIG. 25, the ion collection plate 92 of the tenth embodiment is a screw-shaped ion collection plate 92 which has a plurality of fins 92*a* wherein each ion collision surface is inclined as if being twisted with respect to a plane vertical to the central axis C of the magnetic field. With this configuration, the incident angle of ion debris FI with respect to the ion collision surface (surface of the fin 92*a*) of the ion collection plate 92 can be reduced to a certain level (e.g., to an angle equal to or smaller than 20 degrees), and therefore, the ion debris FI can be received by the ion collection plate 92 more securely. Other structures, operations, and effects are the same as those of the embodiments described heretofore, and the detailed description will not be repeated.

The embodiments and variations described above are illustrated merely by way of example for carrying out the present invention. The present invention, not being limited by the embodiments, can be modified in various forms according to specification, for example, within the scope of the present invention. It is obvious from the description heretofore that various modes of embodiment are possible within the scope of the present invention. Furthermore, the embodiments and variation described above can be combined with each other as appropriate.

The embodiments and variations described above illustrate the examples in which the target material is irradiated with the pre-plasma generation laser to generate the pre-plasma, and the generated pre-plasma is irradiated with a laser light to generate the extreme ultraviolet light. However, without being limited by these examples, the target material may be irradiated with one or more laser lights to be expanded. Then the target material expanded to an optimal size for the generation of extreme ultraviolet light may be irradiated with a laser light so that the extreme ultraviolet light is generated efficiently. Here, "expanded target" refers to a state of cluster, steam, fine particle, plasma, or any combination of these, of the target.

In the embodiments as described above, the ion collecting unit is provided for collecting the ion, and the ion collision surface of the ion collecting unit is provided with or coated with a metal so that the sputtering rate with respect to the ion is less than one atom/ion. Therefore, re-scattering of the material of the ion collision surface and/or the material deposited on the ion collision surface by the sputtering can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept of the invention as defined by the appended claims and their equivalents. Furthermore, the embodiments and variation described above can be combined with each other as appropriate.

What is claimed is:

1. An extreme ultraviolet light source apparatus generating an extreme ultraviolet light from plasma generated by irradiating a target with a laser light, and controlling a flow direction of ion generated at the generation of the extreme ultraviolet light by a magnetic field or an electric field, comprising:
- an ion collector which collects the ion and includes an ion collision surface provided with or coated with a metal whose sputtering rate with respect to the ion is less than 1 atom/ion.

2. The extreme ultraviolet light source apparatus according to claim 1, wherein
- a material of the target is Sn, and
- a material of the ion collision surface is W, Sn, Ru, Mo, Si, or C.

3. The extreme ultraviolet light source apparatus according to claim 1, wherein
- the ion collision surface is inclined in a movement direction of the ion.

4. The extreme ultraviolet light source apparatus according to any one of claims 1 to 3, further comprising:
- a reduction system which is arranged between the plasma generation point and the ion collision surface, and which reduces energy of the ion so that sputtering rate of a material of the target is less than one.

5. The extreme ultraviolet light source apparatus according to claim 4, wherein
- the reduction system includes
  - at least one pre-plasma generation laser that generates plasma and/or steam of the target as a pre-plasma, and
  - an extreme ultraviolet light generation laser that generates the extreme ultraviolet light by irradiating the generated pre-plasma with a laser light.

6. The extreme ultraviolet light source apparatus according to claim 4, further comprising:
- at least one laser that generates a target in which the target is expanded, and
- an extreme ultraviolet light generation laser that generates the extreme ultraviolet light by irradiating the generated expanded target with a laser light.

7. The extreme ultraviolet light source apparatus according to claim 4, wherein
- the reduction system is an electric-field generator that generates an electric field between an ion input side and the ion collision surface of the ion collector for generating Coulomb's force to decelerate the movement of the ion.

8. The extreme ultraviolet light source apparatus according to claim 4, wherein
- the reduction system is a gas portion which is arranged in a previous stage to the ion collision surface and in which a gas region filled with a gas colliding with the ion is formed.

9. The extreme ultraviolet light source apparatus according to claim 4, wherein
- the reduction system includes
  - a plasma generation chamber that generates plasma from the target, and separates and outputs ion from the plasma, and
  - an extreme ultraviolet light generation chamber that generates an extreme ultraviolet light by irradiating the separated and outputted ion with a laser light, to externally output the generated extreme ultraviolet light.

10. The extreme ultraviolet light source apparatus according to claim 4, wherein
- the reduction system includes
  - a steam generation chamber that generates a target steam from the target, and
  - an extreme ultraviolet light generation chamber that generates an extreme ultraviolet light by irradiating the target steam with a laser light to externally output the generated extreme ultraviolet light.

11. The extreme ultraviolet light source apparatus according to claim 4, wherein
- the reduction system is a target supply unit that supplies a target of a minimum required mass for acquisition of a desired output of an extreme ultraviolet light.

12. The extreme ultraviolet light source apparatus according to claim 1, wherein
- the ion collision surface is inclined with respect to a plane vertical to the central axis of the magnetic field by an angle equal to or smaller than 20 degrees.

* * * * *